United States Patent [19]

Akridge

[11] Patent Number: 4,465,745
[45] Date of Patent: Aug. 14, 1984

[54] CRYSTALLINE SOLID LITHIUM CATION CONDUCTIVE ELECTROLYTE

[75] Inventor: James R. Akridge, Parma, Ohio

[73] Assignee: Union Carbide Corporation, Danbury, Conn.

[21] Appl. No.: 509,024

[22] Filed: Jun. 29, 1983

[51] Int. Cl.³ ............................................. H01M 6/18
[52] U.S. Cl. ..................................... 429/191; 429/218
[58] Field of Search ........................ 429/191, 218, 193

[56] References Cited

U.S. PATENT DOCUMENTS 4,042,482  8/1977  Shannon et al. ..................... 429/191
4,331,750  5/1982  Malugani et al. ................... 429/193
4,397,924  8/1983  Rea et al. ............................ 429/191

Primary Examiner—Donald L. Walton
Attorney, Agent, or Firm—Cornelius F. O'Brien

[57] ABSTRACT

A solid state electrolyte for solid state cell systems comprising a crystalline cation conductor of the composition $SiS_2$, $Li_2S$, such as crystalline $Li_2SiS_3$.

11 Claims, No Drawings

CRYSTALLINE SOLID LITHIUM CATION CONDUCTIVE ELECTROLYTE

DESCRIPTION OF THE INVENTION

1. Technical Field

The invention relates to a solid state electrolyte based on a crystalline lithium cation conductor having the composition $SiS_2$, $Li_2S$ in various mole ratios with $Li_2SiS_3$ being the preferred.

2. Background of the Art

Ionic conductivity is usually associated with the flow of ions through a liquid solution of salts. In the vast majority of practical uses of ionic conductors, i.e., as electrolytes for dry cell batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization.

In addition, improved microelectronic circuit designs have generally decreased the current requirements for electronic devices. This in turn has enhanced the applicability of solid electrolyte power sources which usually can deliver currents only in the microampere range. These solid electrolyte systems have the inherent advantages of being free of electrolyte leakage and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow ionic migration in the crystal lattice for the cell to operate. It has been discovered that certain metallic salts which are solids at room temperature have specific conductances sufficiently high to permit their use in practical battery applications. For example, U.S. Pat. No. 3,723,185 discloses solid state electrolytes of compounds conforming to the general formula AgI—MCN—AgCN or modifications thereof wherein M is potassium, rubidium, cesium or mixtures thereof.

U.S. Pat. No. 4,331,750 discloses a cation conductive vitreous composition suitable for use as a solid electrolyte and having the general formula:

$aP_2S_5$, $bLi_2S$, $cLiX$ where:

X represents chlorine, bromine or iodine;
c is greater than or equal to 0;
the ratio $b/(a+b)$ lies between 0.61 and 0.70; and
the ratio $c/(a+b+c)$ is less than or equal to a limit which corresponds to solubility in the vitreous phase of LiX in the composition $aP_2S_5$, $bLi_2S$.

This reference also discloses that the use of various vitreous compositions that conduct cations has been recommended and that these compositions are included in the general formula:

$aA_mY_n$, $bM_2Y$, $cMX$ where:

A represents boron, silicon, germanium or phosphorus;
Y represents oxygen or sulfur;
M represents lithium or sodium; and
X represents chlorine, bromine or iodine and c can be equal to or greater than zero.

U.S. application Ser. No. 509,132 filed concurrently with this application in the name of James R. Akridge discloses a solid state electrolyte for solid state cell systems which comprises a vitreous lithium cation conductor of the composition $SiS_2$, $xLi_2S$, $yLiI$ where x is from 0.8 to 1.5, y is from 0 to about 2 and wherein the composition has a conductivity of at least $0.75 \times 10^{-4}$ $ohm^{-1}cm^{-1}$ at 25° C.

At present a large number of crystalline solid electrolytes both anion and cation conductors are known. The compound with the highest lithium cation conductivity is lithium nitride. This material is unacceptable for battery applications due to its low thermodynamic decomposition potential of about 0.6 volts. Other lithium cation conductors such as lithium $\beta$-alumina, lithium silicates, lithium iodide, etc. are either ceramic materials requiring high preparation temperatures or have unacceptably low conductivities for high performance batteries at room temperature.

It is an object of the present invention to provide a crystalline solid lithium cation conductor that can be prepared at relatively low temperatures (100° C.) and can be formed into dense pellets suitable for use as battery electrolytes via conventional grinding and pressing.

It is another object of the present invention to provide a novel crystalline solid state electrolyte for use in solid state cell systems which electrolyte can be easily molded and requires only a low temperature of preparation.

It is another object of the present invention to provide a novel crystalline solid electrolyte having the composition $SiS_2$, $Li_2S$ in various mole ratios.

It is another object of the present invention to provide a $Li_2S$, $SiS_2$-based crystalline lithium cation conductor.

It is another object of the present invention to provide a crystalline lithium cation conductor composition having the formula $Li_2SiS_3$.

The foregoing and additional objects will become more fully apparent from the following description.

DISCLOSURE OF THE INVENTION

The invention relates to a solid electrolyte for solid state cell systems comprising a $Li_2S$, $SiS_2$-based crystalline lithium cation conductor.

As used herein, a crystalline lithium cation conductor shall mean a lithium ion conductive solid of definite periodic structure in three dimensions.

The crystalline lithium cation conductor of this invention comprises a composition of $SiS_2$ and $Li_2S$ in various mole ratios. Preferably, the composition should be of a 1:1 mole ratio to yield a crystalline composition having the formula $Li_2SiS_3$.

Crystalline $Li_2SiS_3$ can be prepared by mixing silicon disulfide ($SiS_2$) and lithium sulfide ($Li_2S$) in 1:1 mole ratio in an inert environment such as helium. The mixture can be heated between about 100° C. and about 950° C. for a time period of from about one hour to several weeks. The heat-treated mixture can then be gradually cooled to room temperature to produce a crystalline cation conductive solid electrolyte of the stoichiometry $Li_2SiS_3$.

$Li_2SiS_3$ was produced by mixing a 1:1 mole ratio of $SiS_2$ and $Li_2S$ in helium and heating it to 550° C. for about 3 weeks. The heat treated mixture was then gradually cooled to 21° C. An x-ray powder diffraction of the crystalline cation conductive solid electrolyte ($Li_2SiS_3$) produced d-spacings as shown in the Table. Also shown are the relative intensity of the d-spacings based on 100 for d Å of 3.3055 and 3.2292.

TABLE

CRYSTALLINE $Li_2SiS_3$

| d(Å) | $I/I_o$ |
|---|---|
| 6.8239 | 15 |
| 5.6719 | 80 |
| 5.1043 | 20 |
| 4.8028 | 10 |
| 4.5630 | 12 |
| 4.2790 | 35 |
| 4.1476 | 20 |
| 4.0360 | 30 |
| 3.5725 | 5 |
| 3.3668 | 5 |
| 3.3055 | 100 |
| 3.2292 | 100 |
| 3.0765 | 40 |
| 2.9380 | 80 |
| 2.6237 | 5 |
| 2.4765 | 5 |
| 2.3138 | 25 |
| 2.2745 | 7 |
| 2.2182 | 8 |
| 2.1500 | 5 |
| 2.1187 | 5 |
| 2.0524 | 15 |
| 2.0177 | 2 |
| 1.9740 | 20 |
| 1.9382 | 25 |
| 1.9038 | 30 |
| 1.8725 | 6 |
| 1.8081 | 18 |
| 1.7531 | 12 |
| 1.6988 | 8 |
| *1.6428 | 20 |

*Many weak lines to 0.8000 Å

The conductivity of crystalline $Li_2SiS_3$ was found to be $2 \times 10^{-5}$ ohm$^{-1}$cm$^{-1}$ at 25° C. This is sufficient conductivity for this novel crystalline lithium cation conductor to be useful as a solid electrolyte for solid state cell systems.

Specifically, the conductivity was measured by pelletizing (via the application of uniaxial pressure) the powdered material between titanium disulfide electrodes at 13,000 psi in a conventional steel mold with steel rams. The disc of solid electrolyte with $TiS_2$ electrodes was ejected from the mold and then heat sealed in a polyethylene bag. The sample sealed in the bag was then placed in an alcohol filled polytetrafluoroethylene cylinder with a tight fitting lid which was in turn placed in a large steel mold fitted with steel rams. The alcohol filled polytetrafluoroethylene cylinder containing the sample was then compressed to 54,000 psi which results in an isostatic compression of the sample disc and its associated electrodes. The $TiS_2$/solid electrolyte/$TiS_2$ sample was placed in a spring-loaded holder fitted with gold contacts. The conductivity of the sample was measured using the complex plane technique first applied to solid electrolytes by J. E. Bauerle, J. Phys. Chem. Solids, 30, 2657 (1969). The complex plane technique is at present almost universally applied for the measurement of conductivity of solid electrolytes.

Anode materials suitable for use with the solid electrode of this invention include lithium, silver, sodium, potassium and rubidium. The preferred anode material is lithium.

Cathodes suitable for use with the solid electrolyte of this invention include poly(N-vinylpyrrolidone) (PVP)+iodine, PVP+iodine+$TiS_2$, $FeS_2$, $Sb_2S_3$, $TiS_2$, organic charge transfer complexes with halogens, and $MnO_2$.

I claim:

1. A solid electrolyte comprising a $Li_2S$, $SiS_2$-based crystalline lithium cation conductor.

2. The solid electrolyte of claim 1 wherein the crystalline lithium cation conductor is $Li_2SiS_3$.

3. A solid state cell comprising an anode, a cathode and a $Li_2S$, $SiS_2$-based crystalline lithium cation conductor.

4. The solid state cell of claim 3 wherein the crystalline lithium cation conductor is $Li_2SiS_3$.

5. The solid state cell of claim 4 wherein the anode is selected from the group consisting of lithium, silver, sodium, potassium, and rubidium.

6. The solid state cell of claim 4 wherein the cathode is selected from the group consisting of PVP+$I_2$, PVP+$I_2TiS_2$, $FeS_2$, $Sb_2S_3$, $TiS_2$, organic charge transfer complexes with halogens, and $MnO_2$.

7. The solid state cell of claim 4 wherein the anode is lithium and the cathode is $TiS_2$.

8. The solid state cell of claim 4 wherein the anode is lithium and the cathode is $Sb_2S_3$.

9. The solid state cell of claim 4 wherein the anode is lithium and the cathode is PVP+$I_2$+$TiS_2$.

10. The solid state cell of claim 4 wherein the anode is lithium and the cathode is $FeS_2$.

11. The solid state cell of claim 4 wherein the anode is lithium and the cathode is PVP+$I_2$.

* * * * *